United States Patent [19]

Torobin

[11] Patent Number: 4,525,314
[45] Date of Patent: Jun. 25, 1985

[54] PRODUCING METAL AND METAL GLASS MICROFILAMENTS

[76] Inventor: Leonard B. Torobin, 120 Interstate North, Suite 158, Atlanta, Ga. 30339

[21] Appl. No.: 439,894

[22] Filed: Nov. 8, 1982

Related U.S. Application Data

[63] Continuation-in-part of Ser. No. 245,137, Mar. 18, 1981, Pat. No. 4,415,512, and Ser. No. 325,594, Nov. 27, 1981, Pat. No. 4,363,646, which is a continuation-in-part of Ser. No. 152,693, May 23, 1980, Pat. No. 4,303,431, which is a continuation of Ser. No. 59,297, Jul. 20, 1979, abandoned, which is a continuation-in-part of Ser. No. 937,123, Aug. 28, 1978, abandoned, and Ser. No. 944,643, Sep. 21, 1978, abandoned.

[51] Int. Cl.$^3$ .............................................. C03B 19/10
[52] U.S. Cl. .............................................. 264/9; 65/5; 65/16; 65/21.4; 264/12; 264/13; 425/535
[58] Field of Search .................. 65/5, 16, 21.4; 264/9, 264/12, 13

[56] References Cited

U.S. PATENT DOCUMENTS

| | | | |
|---|---|---|---|
| 2,982,991 | 5/1961 | Karlovitz | 65/16 |
| 3,357,808 | 12/1967 | Eberle | 65/7 |
| 3,719,733 | 3/1973 | Rakestraw et al. | 264/9 |
| 3,856,513 | 12/1974 | Chen et al. | 75/122 |
| 3,881,540 | 5/1975 | Kavesh | 264/237 |
| 3,881,541 | 5/1975 | Bedell | 264/175 |
| 3,885,940 | 5/1975 | Levecque et al. | 65/5 |
| 4,116,656 | 9/1978 | Mukai et al. | 65/5 |
| 4,135,903 | 1/1979 | Ohsato | 65/5 |
| 4,303,431 | 12/1981 | Torobin | 65/21.4 |
| 4,303,432 | 12/1981 | Torobin | 65/21.4 |
| 4,303,433 | 12/1981 | Torobin | 65/21.4 |
| 4,326,841 | 4/1982 | Ray | 425/6 |
| 4,363,646 | 12/1982 | Torobin | 65/5 |
| 4,415,512 | 11/1983 | Torobin | 264/9 |

OTHER PUBLICATIONS

Kendal, et al., J. Vac. Sci. Technol., 20 (4), pp. 1091–1093, Apr. 1982.

Primary Examiner—Maurice J. Welsh
Attorney, Agent, or Firm—Perry Carvellas

[57] ABSTRACT

Relatively long metal microfilaments are used to make superior high strength structural materials and/or are used as reinforcing materials in plastic and rubber compositions. A blowing gas is applied at a positive pressure to the inner surface of a metal film formed across a coaxial blowing nozzle to blow the film and form an elongated hollow tube having a thinned wall or weakened portion. An entraining fluid is directed at an angle over and around the blowing nozzle and as it passes over and around the blowing nozzle fluid dynamically induces a pulsating or fluctuating pressure field at the opposite side of the blowing nozzle in the wake thereof and produces a laminar flow of entraining fluid in the vicinity of the forming elongated tube. The continued movement of the entraining fluid over the elongated tube produces asymetric fluid drag forces on the tube, and at the thinned wall portion longitudinally breaks the tube to form a multiplicity of metal microfilaments, and detaches the metal microfilaments from the elongated tube and from the coaxial blowing nozzle. Quench nozzles can be disposed below and on either side of the blowing nozzle to direct cooling fluid at and into contact with the molten metal microfilaments to rapidly cool and solidify the molten metal to form hardened microfilaments.

18 Claims, 6 Drawing Figures

PRODUCING METAL AND METAL GLASS MICROFILAMENTS

The present application is a continuation-in-part of applicant's copending application Ser. No. 245,137, filed Mar. 18, 1981 now U.S. Pat. No. 4,415,512, and copending application Ser. No. 325,594, filed Nov. 27, 1981 now U.S. Pat. No. 4,363,646, both of which applications are continuation-in-part applications of applicant's application Ser. No. 152,693, filed May 23, 1980, which is a continuation of Ser. No. 059,297 filed July 20, 1979, which is a continuation-in-part of applications Ser. Nos. 937,123 and 944,643 filed Aug. 28, 1978 and Sept. 21, 1978, respectively. The application Ser. No. 152,693 is now U.S. Pat. No. 4,303,431. The applications Ser. Nos. 059,297, 937,123 and 944,643 are now abandoned.

SUMMARY OF THE INVENTION

The present invention relates to a method and apparatus for making microfilaments from film forming metal materials or compositions and particularly for making microfilaments from metal glass alloys or compositions.

The present invention particularly relates to metal microfilaments used to make an improved structural material.

The present invention also relates to metal microfilaments spun into fibers or wires which can be used for the manufacture of woven metal fabrics and cables.

The present invention relates to metal microfilaments suitable for use as filler materials and reinforcing materials in rubber, plastics, concrete and asphalt compositions.

The present invention particularly relates to a method and apparatus for using a coaxial blowing nozzle to blow microfilaments from molten film forming metal compositions comprising forming an elongated hollow tube or cylinder of said metal composition and subjecting the tube or cylinder during its formation to an external pulsating or fluctuating pressure field having periodic oscillations. The pulsating of fluctuating pressure field produces a laminar flow or entraining fluid in the vicinity of the forming elongated tube or cylinder which laminar flow assists in the formation of the tube or cylinder and in detaching the microfilaments from the blowing nozzle.

The invention more particularly relates to a method and apparatus for blowing microfilaments from metal glass alloy compositions.

Means are provided for forming a thinned wall or weakened portion of the forming elongated hollow metal tube or cylinder. The thinned wall or weakened portion of the elongated metal tube or cylinder causes a longitudinal break along the length of the elongated metal tube or cylinder. The pulsating or fluctuating pressure field causes the broken elongated tube or cylinder to flap and to form a multiplicity of small diameter metal filaments. The contained feeding of molten metal to the coaxial nozzle stabilizes the longitudinal break in the elongated tube or cylinder a short distance below the coaxial nozzle. The metal microfilaments are entrained in the entraining fluid, increase in length, are stretched and pulled and break away from the portion of the elongated cylinder attached to the coaxial nozzle.

A transverse jet is used to induce the external pulsating or fluctuating pressure field by directing the entraining fluid over and around the blowing nozzle at an angle to the axis of the blowing nozzle. The entraining fluid as it passes over and around the blowing nozzle envelops and acts on the molten film forming metal composition as it is being blown to form the elongated metal tube or cylinder and the metal microfilaments and to detach the metal microfilaments from the coaxial blowing nozzle.

Quench means are disposed close to and below the blowing nozzles to direct a quench fluid onto the metal microfilaments to rapidly cool and solidify the metal microfilaments.

BACKGROUND OF THE INVENTION

In recent years, the substantial increases in costs of basic materials such as metals, metal alloys, plastics, rubbers and the like has encouraged development and use of light weight structural materials, reinforcing materials and of filler materials to reduce the amount and cost of the basic materials used and the weight of the finished materials.

The known methods of producing metal and metal glass filaments and wires suffer the disadvantages of requiring the use of relatively large amounts of energy to manufacture a given amount of filaments or wire and from relatively low production rates.

The known methods of producing metal and metal glass filaments and wires are also believed to suffer the disadvantages of not being able to produce filaments and wires of relatively small uniform diameters and uniform lengths and of not being able to achieve rapid uniform quench rates, which disadvantages would make it difficult to produce materials of controlled and predictable characteristics, quality and strength.

The Kavesh U.S. Pat. No. 3,845,805 describes a known process for making metal filaments and wires which process comprises forming a free jet of molten metal in a gaseous interface, traversal of the free jet through the interface into a fluid quench medium flowing concurrently with the molten metal jet and rapid cooling and solidification of the metal jet into filamentary form.

The Chen et al U.S. Pat. No. 3,856,513 discloses various metal alloy compositions and a process for making a metal filament or wire from the disclosed compositions which process comprises squirting a molten jet or stream of the metal alloy composition into a quench medium of stationary water or refrigerated brine. The Chen et al patent disclosed compositions and method can produce amorphous metal filaments and wires.

The process and apparatus of the present invention are believed to overcome the disadvantages of the prior art processes and are capable of producing microfilaments of uniform diameter and relatively uniform length of controlled and predictable physical and chemical characteristics, quality and strength at economical low costs. These advantages are achieved by the method of the present invention by which the small diameter microfilaments are formed and the capability of rapidly and uniformally quenching the microfilaments.

The present invention produces relatively long metal microfilaments of uniform small diameter and of relatively uniform length at an economical low price.

OBJECTS OF THE INVENTION

It is an object of the present invention to provide a process and an apparatus for making relatively long metal and metal glass microfilaments.

It is another object of the present invention to provide the metal and metal glass microfilaments that are useful in the manufacture of improved structural materials.

It is another object of the present invention to make metal and metal glass microfilaments for use as reinforcing materials.

It is another object of the present invention to produce metal and metal glass microfilaments having relatively long lengths and relatively uniform diameter size distribution.

It is another object of the present invention to provide metal and metal glass microfilaments for use in producing wires, fibers and woven metal fabrics.

It is another object of the present invention to produce in an economical simple manner metal microfilaments which are substantially uniform in diameter, length and strength characteristics.

BRIEF DESCRIPTION OF THE INVENTION

The present invention relates to metal material microfilaments and to a process and apparatus for making the microfilaments. The present invention more particularly relates to metal glass alloy material microfilaments and to a process and apparatus for making the microfilaments.

The microfilaments are preferably made from film forming metal material compositions or from film forming metal alloy material compositions.

The metal material microfilaments of the present invention are made by forming a liquid film of molten metal material across a coaxial blowing nozzle, applying a blowing gas or an inert blowing gas at a positive pressure on the inner surface of the metal film to blow the film and form an elongated hollow tube or cylinder shaped liquid film of molten metal material. The elongated tube or cylinder is initially closed at its outer end and is attached at its inner end to the coaxial blowing nozzle. Means are provided in the coaxial blowing nozzle for forming a thinned wall or weakened portion of the forming elongated tube or cylinder. A transverse jet is used to direct an entraining fluid over and around the blowing nozzle. The entraining fluid as it passes over and around the blowing nozzle fluid dynamically induces a pulsating or fluctuating pressure field at the opposite or lee side of the blowing nozzle in the wake or shadow of the coaxial blowing nozzle and produces a laminar flow of entraining fluid in the area of the forming elongated tube or cylinder. The fluctuating pressure field has regular periodic lateral oscillations similar to those of a flag flapping in a breeze. The continued movement of the entraining fluid over the elongated cylinder produces asymmetric fluid drag forces on the cylinder, and at the thinned walled or weakened portion longitudinally breaks the cylinder to form a multiplicity of metal microfilaments, and detaches the microfilaments from the elongated cylinder and from the coaxial blowing nozzle and the detached filaments are carried away from the blowing nozzle. The surface tension forces of the molten metal material act on the microfilaments and cause the diameter of the microfilaments to seek a minimum surface area and to form a circular cross-section.

The thin walled or weakened section of the elongated cylinder causes the cylinder to break along its longitudinal length. The induced fluctuating pressure field causes the elongated cylinder to flap and to quickly enlarge the break and to form a multiplicity of small diameter microfilaments. The break proceeds up the length of the elongated cylinder towards the coaxial nozzle. The continued feeding of molten metal material to the coaxial nozzle stabilizes the break a short distance below the coaxial nozzle. The microfilaments are entrained in the transverse jet entraining fluid, are stretched, increase in length and pulled and break away from the portion of the elongated cylinder attached to the coaxial blowing nozzle.

The means for providing the thinned wall or weakened portion of the forming elongated hollow tube or cylinder may be contained within the coaxial blowing nozzle in the annular space between the outer coaxial nozzle and the inner coaxial nozzle. The means provided may take the form of one or more thickened or enlarged portions of the inner nozzle disposed lengthwise on the outer surface of the inner nozzle. The length, diameter and height of the thickened or enlarged portions are such that they cause the flow of molten metal material as it passes over and around the thickened or enlarged portions to become thinned and weakened. The thinned and weakened portion of the molten metal material is carried downwardly and outwardly into the forming elongated hollow cylinder or tube. It is this thinned or weakened portion of the forming elongated hollow cylinder or tube that causes the cylinder or tube to break along its length and form the microfilaments. The thickened portion of the inner nozzle is disposed at or near the outer edge of the inner nozzle.

The molten metal material temperature and feed rate, the transverse jet entraining fluid linear velocity, the blowing gas pressure and the quench rate at a given coaxial nozzle gap will to some extent determine the microfilament length and diameter and size distribution.

A balancing but slightly lower gas pressure than the blowing gas pressure is provided in the area in which the elongated cylinder is formed.

Quench nozzles may be disposed below and on either side of the blowing nozzle to direct cooling fluid at and into contact with the molten metal material microfilaments to rapidly cool and solidify the molten metal material and form a hard, smooth microfilament of relatively long length.

THE ADVANTAGES

The present invention overcomes many of the problems associated with prior attempts to produce metal filaments and wires. The process and apparatus of the present invention allows the production of metal material microfilaments of relatively long length and relatively uniform diameter such that superior structural materials and improved filler and reinforcing materials can be designed, manufactured and tailor made to suit a particular desired use.

The relatively long metal material microfilaments produced in accordance with the present invention have the distinct advantage that due to the method of manufacture and the small uniform diameters of the microfilaments obtained that a uniformed controlled cooling of the microfilaments can be achieved.

The process and apparatus of the present invention provide a practical and economical means by which relatively long metal material and metal glass microfilaments can be manufactured for use as structural, filler and reinforcing materials.

The process and apparatus of the present invention also provide for the production of metal material microfilaments at economic prices and in large quantities.

The metal glass microfilaments of the present invention because of their relatively long length can be spun into fibers from which high strength wire cables can be made or can be woven into fabrics, e.g. to be used in the manufacture of magnetic shields and filters.

BRIEF DESCRIPTION OF THE DRAWINGS

The attached drawings illustrate exemplary forms of the method and apparatus of the present invention for making metal material microfilaments.

The FIG. 1 of the drawings shows in cross-section an apparatus having multiple coaxial blowing nozzle means for supplying the gaseous material for blowing metal material microfilaments, a transverse jet for providing an entraining fluid to assist in the formation and detachment of the metal material microfilaments from the blowing nozzles, and means for supplying a quench fluid to cool the metal material microfilaments.

The FIG. 3 of the drawings is an enlarged detailed cross-section of a modified form of a blowing nozzle in which the lower end of the nozzle is tapered inwardly.

The FIG. 4A of the drawings is a detailed cross-section and a top plane view of a coaxial blowing nozzle tip of the type shown in FIG. 2.

The FIG. 4B of the drawings is a detailed cross-section and top plane view of a coaxial blowing nozzle tip of the type illustrated in FIG. 3 of the drawings.

The FIG. 4C of the drawings is a detailed cross-section and top plane view of a modified form of a coaxial blowing nozzle.

DETAILED DISCUSSION OF THE DRAWINGS

The invention will be described with reference to the accompanying Figures of the drawings wherein like numbers designate like parts throughout the several views.

Figure 1:
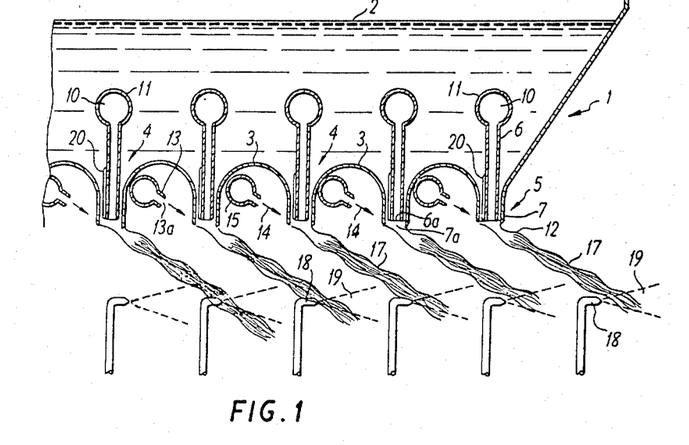
Figure 2:
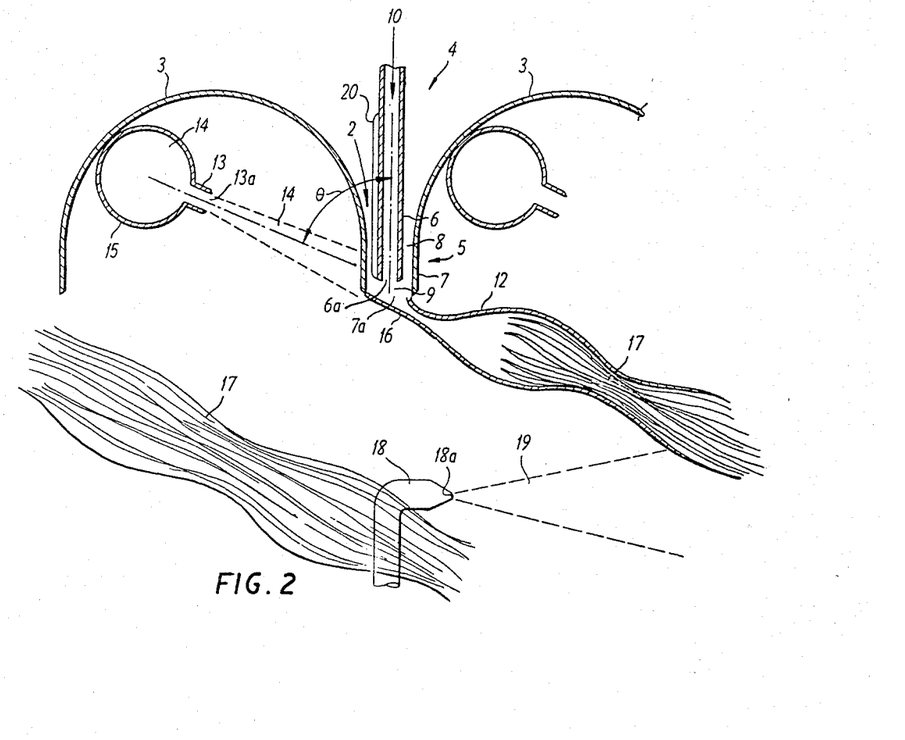
FIG. 2 of the drawings is an enlarged detailed cross-section of the nozzle means of apparatus shown in FIG. 1.

Referring to FIGS. 1 and 2 of the drawings, there is illustrated a vessel 1, made of suitable refractory material and heated by means not shown for holding molten film forming metal material. The bottom floor 3 of vessel 1 contains a plurality of openings 4 through which molten metal 2 is fed to coaxial blowing nozzles 5. The coaxial blowing nozzle 5 can be made separately or can be formed by a downward extension of the bottom 3 of vessel 1. The coaxial blowing nozzle 5 consists of an inner nozzle 6 having an orifice 6a for blowing gas or an inert blowing gas and an outer nozzle 7 having an orifice 7a for molten metal. The inner nozzle 6 is disposed within and coaxial to outer nozzle 7 to form annular space 8 between nozzles 6 and 7, which annular space provides a flow path for molten metal 2. The orifice 6a of inner nozzle 6 terminates at or a short distance above the plane of orifice 7a of outer nozzle 7.

There is disposed in annular space 8 on the outer surface of inner nozzle 6 a thickened or enlarged portion 20 means for providing the thinned wall or weakened portion of the elongated hollow metal tube or cylinder. The length, diameter and height of the thickened or enlarged portion 20 are such that they cause the flow of molten metal as it passes over and around the thickened or enlarged portion 20 to become thinned and weakened.

The molten metal film forming metal material 2 at about atmospheric pressure or at elevated pressure flows downwardly through annular space 8 and fills the area 9 between orifice 6a and 7a. The surface tension forces in molten metal 2 form a thin liquid molten metal film 9 across orifice 6a and 7a.

A blowing gas 10 which is heated by means not shown to about the temperature of the molten metal and which is at a pressure above the molten metal pressure at the blowing nozzle, is fed through distribution conduit 11 and inner coaxial nozzle 6 and brought into contact with the inner surface of molten metal film 9. The blowing gas exerts a positive pressure on the molten metal film to blow and distend the film outwardly to form the elongated cylinder shaped liquid film 12 of molten metal filled with the blowing gas 10. The elongated cylinder 12 is initially closed at its outer end and is connected at its inner end to outer nozzle 7 at the peripheral edge of orifice 7a. The thinned and weakened portion of the molten metal is carried downwardly and outwardly to form the elongated hollow metal tube or cylinder 12.

The elongated hollow tube or cylinder is subjected during its formation to an external pulsating or fluctuating pressure field having periodic oscillations. The pulsating or fluctuating pressure field produces a laminar flow of entraining fluid in the vicinity of the forming elongated hollow metal tube or cylinder 12.

The thinned wall or weakened portion of the elongated cylinder or tube 12 causes a longitudinal break along the length of the elongated cylinder 12. The pulsating or fluctuating pressure field causes the broken elongated cylinder 12 to flap and to form a multiplicity of small diameter microfilaments 17. The continued feeding of molten metal 2 to the coaxial nozzle 5 stabilizes the longitudinal break in the elongated cylinder a short distance below the coaxial nozzle 5. The metal microfilaments, however, remain connected to each other at the end of the elongated cylinder connected to the coaxial blowing nozzle. The microfilaments 17 are entrained in the entraining fluid 14, increase in length, are stretched and pulled and break away from the portion of the elongated cylinder attached to the coaxial nozzle.

A balancing pressure of a gas or of an inert gas, i.e. a slightly lower pressure, is provided in the area of the blowing nozzle into which the elongated tube or cylinder shaped liquid film is blown. The illustrated coaxial nozzle can be used to produce metal microfilaments having relatively long lengths and relatively thick uniform diameters and is useful in blowing metal microfilaments from low viscosity metal materials.

A transverse jet 13 is used to induce the external pulsating or fluctuating pressure field by directing an entraining fluid 14 over and around the blowing nozzle 5 at an angle to the axis of the blowing nozzle. The entraining fluid 14 is heated to about, below or above the temperature of the molten metal 2, by means not shown. The entraining fluid 14 is fed through distribution conduit 15, nozzle 13 and transverse jet nozzle orifice 13a and directed at the coaxial blowing nozzle 5. The transverse jet 13 is aligned to direct the flow of entraining fluid 14 over and around blowing nozzle 7 in the microfilament forming region at and behind the orifice 7a. The entraining fluid as it passes over and around the blowing nozzle 5 envelops and acts on the molten metal as it is being blown to form the elongated hollow metal tube or cylinder 12 and the microfilaments 17 and to detach the microfilaments form the coaxial blowing nozzle. The surface tension forces of the molten metal act on diameter of the entrained, falling microfilaments 17 and cause the diameter of the microfilaments to seek a minimum surface area and to form a circular shaped cross-section area.

Quench nozzles 18 having orifices 18a may be disposed below and on both sides of coaxial blowing nozzle 5 to direct cooling fluid 19 at and into contact with the molten metal microfilaments 17 to rapidly cool and solidify the molten metal and form hard, smooth metal microfilaments. The quench fluid 19 may also serve to carry the metal microfilaments away from the coaxial blowing nozzle 5. The cooled and solidified metal glass microfilaments are collected by suitable means not shown.

Figures 3, 4A, 4B, 4C:
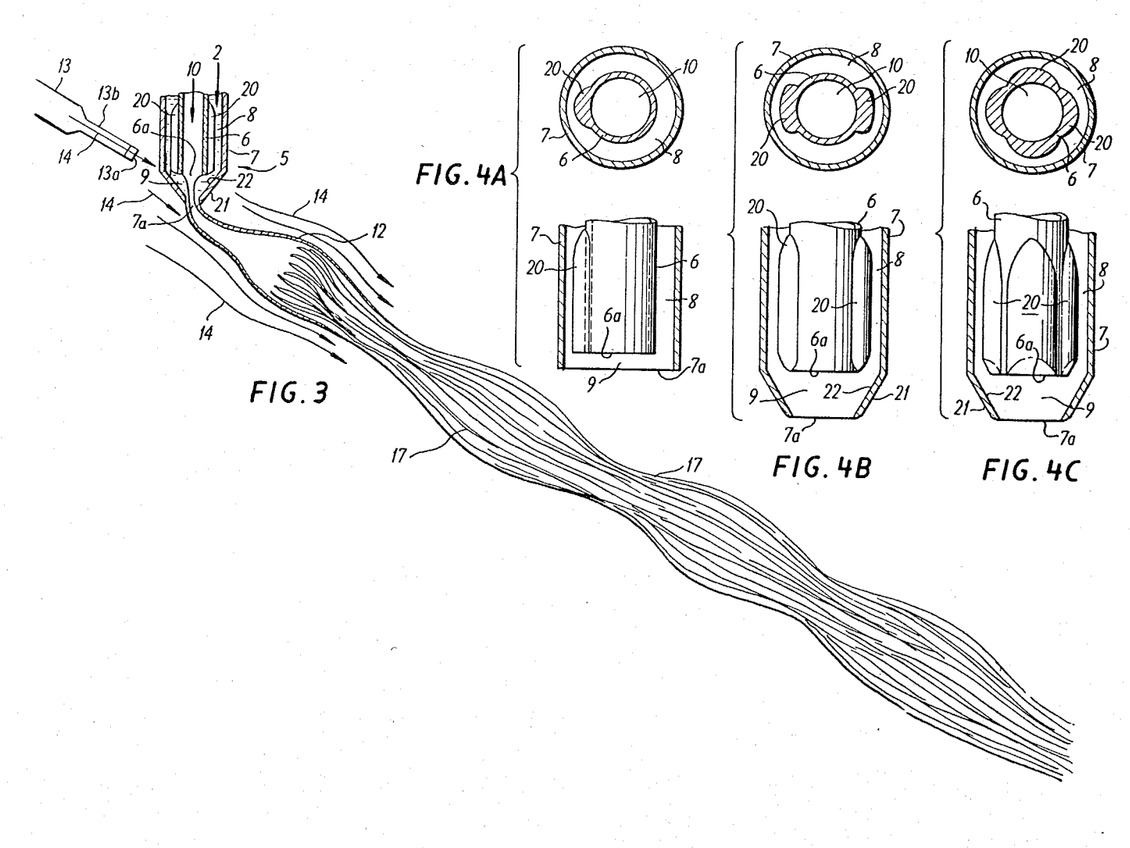

The FIG. 3 of the drawings illustrates a preferred embodiment of the invention in which the lower portion of the outer coaxial nozzle 7 is tapered downwardly and inwardly at 21. This embodiment as in the previous embodiment comprises coaxial blowing nozzle 5 which consists of inner nozzle 6 with orifice 6a and outer nozzle 7 with orifice 7a. The figure of the drawings also shows elongated hollow metal tube or cylinder shaped liquid film 12 with a pinched portion 16 and a multiplicity of metal microfilaments 17. There is shown disposed in annular space 8 on two opposite sides of the lower outer surface of inner nozzle 6 two thickened or enlarged portions 20 means for providing the thinned wall or weakened portion of the elongated hollow metal tube or cylinder 12. The length, diameter and height of the thickened or enlarged portions 20 are such that they cause the flow of molten metal as it passes over and around the enlarged or thickened portions 20 to become thinned and weakened.

The use of the tapered nozzle 21 construction was found to substantially assist in the formation of a thin molten metal film 9 in the area between orifice 6a of inner nozzle 6 and orifice 7a of outer nozzle 7. The inner wall surface 22 of the taper portion 21 of the outer nozzle 7 when pressure is applied to molten metal 2 forces the molten metal 2 to squeeze through a fine gap formed between the outer edge of orifice 6a and the inner surface 22 to form the thin molten metal film 9 across orifice 6a and 7a. Thus, the formation of the molten metal film 9 does not in this embodiement rely solely on the surface tension properties of the molten metal. The illustrated coaxial nozzle can be used to produce metal microfilaments having relatively long lengths and allows making microfilaments of smaller diameter than those made using the FIG. 2 apparatus and is particularly useful in blowing high viscosity metal material compositions.

The diameter of the metal microfilaments is determined in part by the thickness of the wall of the elongated hollow metal tube or cylinder which is determined by the gap formed by the tapered nozzle 21 and the outer edge of the inner nozzle 6a. This apparatus allows the use of larger inner diameters of outer nozzle 7 and larger inner diameters of inner nozzle 6, both of which reduce the possibility of plugging of the coaxial nozzles when in use.

The FIG. 3 of the drawings also shows an embodiment of the invention in which the outer portion of the transverse jet 13 is flattended to form a generally rectangular or oval shaped orifice opening 13a. The orifice opening 13a can be disposed at an angle relative to a line drawn through the central axis of coaxial nozzle 5. The preferred angle, however, is that illustrated in the drawing. That is, at an angle of about 90° to the central axis of the coaxial nozzle 5.

The use of the flattened transverse jet entraining fluid was found, at a given velocity, to concentrate the effect of the fluctuating pressure field and to increase the amplitude of the pressure fluctuations induced in the region of the formation of the elongated hollow metal tube or cylinder at the opposite or lee side of the blowing nozzle 5.

The FIGS. 4A, 4B and 4C of the drawings show detailed cross sections and top plane views of three embodiments of the coaxial blowing nozzle tips of the present invention.

In the FIG. 4A there is shown disposed in annular space 8 on the lower outer surface of inner nozzle 6 a single thickened or enlarged portion 20 for providing the thinned wall or weakened portion of the elongated hollow tube or cylinder 12.

In the FIG. 4B there is shown disposed in annular space 8 on opposite sides of the lower outer surface of inner nozzle 6 two thickened or enlarged portions 20 for providing the thinned wall or weakened portions of the elongated hollow tube or cylinder 12.

In FIG. 4C there is shown disposed in annular space 8 equally spaced on the outer surface of inner nozzle 6 four thickened or enlarged portions 20 for providing the thinned wall or weakened portions of the elongated hollow tube or cylinder 12.

FILM FORMING METAL MATERIAL AND METAL GLASS ALLOY COMPOSITIONS

The film forming metal material compositions and particularly the metal glass alloy compositions from which the metal microfilaments of the present invention are made can be widely varied to obtain the desired physical characteristics for heating, blowing, forming, cooling, and hardening the microfilaments and the disired strength characteristics of the metal microfilaments produced.

Metal and metal glass compositions that are suitable for use in the present invention are described in applicant's copending application, Ser. No. 245,137, filed Mar. 18, 1981, which is incorporated by reference herein in its entirety.

The constituents of the metal compositions can vary widely, depending on the intended use of the microfilaments, and can include small amounts of naturally occuring impurities.

The film forming metal compositions are formulated to have relatively high melting and fluid flow temperatures with a relatively narrow temperature difference between the melting, i.e. fluid flow and hardening temperatures. The metal compositions are formulated such that they have a high rate of viscosity increase with decreasing temperature so that the microfilaments will rapidly solidify, harden and strengthen on cooling.

There may be added to the metal compositions chemical agents which affect the viscosity of the compositions in order to obtain the desired viscosities for blowing the microfilaments.

The process and apparatus of the present invention can be used to blow microfilaments from suitable film forming metal materials or compositions, for example, metal glass alloy compositions, having sufficient viscosity at the temperature at which the microfilaments are blown to form a stable elongated cylinder shape of the metal material being blown.

The film forming metal materials of the present invention, e.g. the metal glass alloy compositions depending on the constituents of the compositions, the diameters of the microfilaments and the quench or cooling rate can form polycrystalline, partially polycrystalline and partially amorphous solid microfilaments and substantially or completely amorphous solid microfilaments.

The quench rates needed to obtain substantially or completely amorphous solid microfilaments are in the order of $10^{4°}$ to $10^{6°}$ C. per second. The metal glass alloy microfilaments made from compositions which on rapid cooling form substantially amorphous solids are a preferred embodiment of the invention.

The metals to be used to form the microfilaments are selected and can be treated and/or mixed with other materials, e.g. other metals, to adjust their viscosity and surface tension characteristics such that at the desired blowing temperatures they form stable films and are capable of forming elongated hollow metal tubes or cylinders of the desired length and diameters.

To assist in the blowing and formation of the microfilaments and to control the surface tension and viscosity of the elongated cylinder being formed suitable surface active agents, such as colloidal particles of insoluble substances and viscosity stabilizers can be added to the metal material as additives.

In a preferred embodiment of the present invention metal glass compositions are used as the film forming metal material. The term metal glass(es) as used herein is intended to mean the metal glass alloy materials and compositions which on rapid cooling from a temperature above their liquidus temperature to below their glass temperature can form amorphous solids.

The term liquidus temperature as used herein is defined as the temperature at which the liquid and crystal phases of a metal alloy composition can exist in equilibrium, that is the temperature at which the crystalline phase can first appear when the liquid is cooled.

The term glass temperature as used herein is defined as the temperature at which the configuration of the metal alloy atoms become frozen in an amorphous solid state.

To form metal(lic) glass(es) it is necessary to rapidly cool the molten metal alloy composition from a temperature of about or just above the liquidus temperature to or below the metal glass temperatrue at a rate of $10^{4°}$ to $10^{6°}$ C. per second. Some metal glass or glassy metal alloys at temperatures of about their liquidus temperature can have viscosities of about 10 poises. At the glass temperatures, the metal glass alloy viscosities rapidly increase to about $10^{15}$ poises. Materials that resist change in shape this strongly are rigid enough to be considered solids, and are herein referred to as solids.

There are a wide variety of metal glass alloy compositions which can be used in accordance with the process and apparatus of the present invention to make metal glass microfilaments.

There is a substantial amount of published literature and a substantial number of patents which disclose various metal glass alloy compositions which are capable of forming partially, substantially or completely amorphous solids.

The Chen et al U.S. Pat. No. 3,856,513 discloses metal glass alloy compositions which can form amorphous solids.

The Masumoto et al U.S. Pat. No. 3,986,867 discloses metal glass alloy compositions which form amorphous alloys which have high heat resistance, high corrosion resistance and excellent mechanical properties.

The Ray et al U.S. Pat. No. 4,366,638 discloses binary amorphous alloy compositions of iron or cobalt and boron which have high mechanical hardness and soft magnetic properties.

The Ray U.S. Pat. Nos. 4,210,443 and 4,221,592 also disclose metal glass alloy compositions which form amorphous solids.

The disclosures of each of the five above-mentioned patents are incorporated by reference herein in their entirety.

The metal microfilaments and particularly the metal glass microfilaments can be blown with a gas, e.g. an inert gas. Suitable blowing gases are argon, nitrogen and air.

The blowing gases can be selected to react with the metal film forming material or composition. The blowing gas reacting with the film forming material as the elongated cylinder is being blown and formed, can to some extent help to stabilize (against break-up) the film forming metal material used to form the elongated cylinder and microfilaments and allow sufficient time for the microfilaments to form and harden.

PROCESS CONDITIONS

The film forming metal materials and/or compositions of the present invention are heated to a temperature at which they are molten, e.g. above their liquidus temperature and maintained in a liquid, fluid form during the blowing operation.

Many of the known metal glass alloy compositions have liquidus temperatures within the range of 900° to 1200° C. and glass temperatures within the range of 300° to 500° C. depending on the constituents of the compositions.

The film forming metal compositions at temperatures at which they are molten, e.g. above their liquidus temperatures are fluid and flows easily. The molten film forming metal composition, however, just prior to the blowing operation, i.e. just before beginning of the formation of the hollow elongated tube or cylinder, can have a viscosity of 10 to 600 poises, preferably 20 to 350, and more preferably 30 to 200 poises.

The molten metal material is continuously fed to the coaxial blowing nozzle during the blowing operation to prevent premature breaking and detaching of the microfilaments as they are being formed.

The blowing gas or inert blowing gas will be at about the same temperature as the molten metal being blown. The blowing gas temperature can, however, be at a higher temperature than the molten metal to assist in maintaining the fluidity of the elongated hollow metal tube or cylinder during the blowing operation or can be at a lower temperature than the molten metal to assist in the solidification and hardening of the metal microfilaments as they are formed. The pressure of the blowing gas is sufficient to blow the hollow elongated metal cylinder and will be slightly above the pressure of molten metal at the orifice 7a of the outer nozzle 7. The blowing gas pressure will also depend on and be slightly above the ambient pressure external to the blowing nozzle.

The temperatures of the blowing gases will depend on the blowing gas used and the viscosity-temperatures-hear relationship of the film forming metal material used to make the microfilaments.

The transverse jet inert entraining fluid which is directed over and around the coaxial blowing nozzle to assist in the formation of the hollow elongated cylinder and detaching of the metal microfilaments from the coaxial blowing nozzle can be at about the temperature of the molten metal being blown. The entraining fluid can, however, be at a higher temperature than the molten metal to assist in maintaining the fluidity of the hollow elongated tube or cylinder and the microfilaments during the blowing operation or can be at a lower temperature than the molten metal to assist in the stabilization of the forming film and in the solidification and hardening of the microfilaments as they are formed.

The transverse jet entraining fluid which is directed over and around the coaxial blowing nozzle to assist in the formation of the hollow elongated cylinder and detaching of the metal microfilaments from the coaxial blowing nozzle can have a linear velocity in the region of microfilament formation of 5 to 120 ft/sec, usually 10 to 80 ft/sec and more usually 20 to 60 ft/sec.

The length of the microfilaments and the diameter of the microfilaments depends to some extent on the viscosity of the metal material and the linear velocity of the transverse jet entraining fluid.

The quench fluid can be a a temperature such that it rapidly cools the molten metal microfilaments to solidify, harden and strengthen the metal microfilaments. The quench fluid can be at a temperature of 0° to 200° F., preferably 40° to 200° F. and more preferably 50° to 100° F. depending to some extent on the composition of the film forming metal material to be cooled.

Where aqueous brine or ethylene glycol dispersions are used, quench temperatures of −60° C. and −50° C., respectively, can be obtained.

Where very rapid or high cooling rates are desired, cryogenic fluids such as liquid nitrogen, helium or argon can be used.

Where cryogenic fluids are used to cool the microspheres, temperatures as low as −195° C. for nitrogen, −168° C. for helium, and −185° C. for argon can be obtained in the vicinity of the microfilaments by use of dispersed sprays of the cryogenic fluids.

The time elapsed from commencement of the blowing of the hollow elongated metal cylinder to the cooling and hardening of the metal microfilaments can be 0.0001 to 1.0 second, preferably 0.0010 to 0.50 second and more preferably 0.010 to 0.10 second.

Suitable cooling rates are of the order of $10^{4°}$ to $10^{6°}$ C. per second, i.e. about $1.8 \times 10^{4°}$ to $1.8 \times 10^{6°}$ F. per second. When cooling the metal glass alloy compositions of the present invention to obtain amorphous metal microspheres cooling rates of $10^{4°}$ to $10^{6°}$ C. per second are preferred. The quench rate required will to some extent depend on the metal material composition and on the diameter of the microfilament.

APPARATUS

Referring to FIGS. 1 and 2 of the drawings, the refractory vessel is constructed to maintain the molten metal film forming material at the desired operating temperatures. The molten metal 2 is fed to coaxial blowing nozzle 5. The coaxial blowing nozzle 5 consists of an inner nozzle 6 having an outside diameter of 0.32 to 0.010 inch, preferably 0.20 to 0.015 inch and more preferably 0.10 to 0.020 inch and an outer nozzle 7 having an inside diameter of 0.420 to 0.020 inch, preferably 0.260 to 0.025 and more preferably 0.130 to 0.030 inch. The inner nozzle 6 and outer nozzle 7 form annular space 8 which provides a flow path through which the molten metal 2 is extruded. The distance between the inner nozzle 6 and outer nozzle 7 can be 0.050 to 0.004, preferably 0.030 to 0.005 and more preferably 0.015 to 0.008 inch.

The orifice 6a of inner nozzle 6 terminates a short distance above the plane of orifice 7a of outer nozzle 7. The orifice 6a can be spaced above orifice 7a at a distance of 0.001 to 0.125 inch, preferably 0.002 to 0.050 inch and more preferably 0.003 to 0.025 inch. The molten film forming metal material 2 flows downwardly and is extruded through annular space 8 and fills the area between orifice 6a and 7a. The surface tension forces in the molten metal 2 film forming material form a thin liquid molten metal film 9 across orifice 6a and 7a which has about the same or a smaller thickness as the distance of orifice 6a is spaced above orifice 7a. The orifices 6a and 7a can be made from quartz, zirconia or fused alumina. The surface tension forces in the liquid film forming metal material 2 form a thin liquid film forming metal material film 9 across orifices 6a and 7a which has about the same or a smaller thickness as the distance of orifice 6a is spaced above orifice 7a. The molten film forming metal material film 9 can be 25 to 3175 microns, preferably 50 to 1270 microns and more preferably 76 to 635 microns thick.

The FIG. 2 blowing nozzle can be used to blow molten film forming metal material at relatively low viscosities, for example, of 10 to 60 posies, and to blow film forming metal material microfilaments of relatively thick diameter, for example, of 20 to 100 microns or more.

The transverset jet 13 is used to direct an entraining fluid 14 through nozzle 13 and transverse jet nozzle orifice 13a at the coaxial blowing nozzle 5. The coaxial blowing nozzle 5 has an outer diameter of 0.52 to 0.030 inch, preferably 0.36 to 0.035 inch and more preferably 0.140 to 0.040 inch.

The transverse jet 13 is aligned to direct the flow of entraining fluid 14 over and around outer nozzle 7 in the hollow elongated tube or cylinder and microfilament forming region of the orifice 7a. The orifice 13a of transverse jet 13 is located a distance of 0.5 to 14 times, preferably 1 to 10 times and more preferably 1.5 to 8 times and still more preferably 1.5 to 4 times the outside diameter of coaxial blowing nozzle 5 away from the point of intersect of a line drawn along the center axis of transverse jet 13 and a line drawn along the center axis of coaxial blowing nozzle 5. The center axis of transverse jet 13 is aligned at an angle to 15° to 85°, preferably 25° to 75° and more preferably 35° to 55° relative to the center axis of the coaxial blowing nozzle 5. The orifice 13a can be circular in shape and have an inside diameter of 0.32 to 0.010 inch, preferably 0.20 to 0.015 inch and more preferably 0.10 to 0.020 inch.

The line drawn through the center axis of transverse jet 13 intersects the line drawn through the center axis of coaxial blowing nozzle 5 a a point above the orifice 7a of outer nozzle 7 which is 0.5 to 4 times, preferably 1.0 to 3.5 times and more preferably 2 to 3 times the outside diameter of the coaxial blowing nozzle 5.

The entraining fluid assists in the formation and detaching of the metal microfilaments from the coaxial blowing nozzle. The use of the transverse jet and entraining fluid in the manner described also discourages wetting of the outer wall surface of the coaxial blowing nozzle 5 by the molten metal material being blown.

The quench nozzles 18 are disposed below and on both sides of coaxial blowing nozzle 5 a sufficient distance apart to allow the microfilaments 17 to fall between the quench nozzles 18. The quench nozzles 18 direct cooling fluid 19 at and into contact with the molten metal microfilaments 17 to rapidly cool and solidify the molten metal and form hard, smooth, metal microfilaments.

The FIG. 3 of the drawings illustrates a preferred embodiment of the invention. It is found that in blowing molten film forming metal material at high viscosities that is is advantageous to immediately prior to blowing the molten film forming metal material to provide by extrusion a very thin molten film forming metal material liquid film for blowing into the elongated cylinder shape liquid film 12. The thin molten film forming metal material liquid film 9 is provided by having the lower portion of the outer coaxial nozzle 7 tapered downwardly and inwardly at 21. The tapered portion 21 and inner wall surface 22 thereof can be at an angle of 15° to 75°, preferably 30° to 60° and more preferably about 45° relative to the center axis of coaxial blowing nozzle 5. The orifice 7a can be 0.10 to 1.5 times, preferably 0.20 to 1.1 times and more preferably 0.25 to 0.8 times the inner diameter of orifice 6a of inner nozzle 6.

The thickness of the molten metal film forming material liquid film 9 can be varied by adjusting the distance of orifice 6a of inner nozzle 6 above orifice 7a of outer nozzle 7 such that the distance between the peripheral edge of orifice 6a and the inner wall surface 22 of tapered nozzle 21 can be varied. By controlling the distance between the peripheral edge of orifice 6a and the inner wall surface 22 of the tapered nozzle to form a very fine gap and by controlling the pressure applied to feed the molten film forming metal material 2 through annular space 8 the molten film forming metal material 2 can be squeezed or extruded through the very fine gap to form a relatively thin molten film forming metal material liquid film 9.

The proper gap can best be determined by pressing the inner coaxial nozzle 6 downward with sufficient pressure to completely block-off the flow of film forming metal material and to then very slowly raise the inner coaxial nozzle 6 until a stable system is obtained, i.e. until the hollow elongated metal cylinder and the metal microfilaments are being formed.

The tapered nozzle construction illustrated in FIG. 3 can be used to blow metal material compositions at relatively high viscosities as well as to blow film forming metal compositions at the relatively low viscosities referred to with regard to FIG. 2 of the drawings. The FIG. 3 embodiment of the invention is of particular advantage in blowing relatively long, small diameter microfilaments.

Referring to FIGS. 4A, 4B and 4C of the drawings there is shown disposed in annular space 8 on the outer surface of inner nozzle 6 thickened or enlarged protion 20 means of providing the thinned wall or weakened protion of the elongated hollow tube or cylinder. The length, diameter and height of the thickened or enlarged portion 20 are such that they cause the flow of molten metal as it passes over and around the thickened or enlarged portion 20 to become thinned and weakened. The thinned and weakened portion of the molten metal is carried downwardly and outwardly to form the elongated hollow metal tube or cylinder 12, which as a result of the thinned and weakened portion breaks up into a multiplicity of relatively long microfilaments 17.

DESCRIPTION OF METAL MICROFILAMENTS

The metal microfilaments made in accordance with the present invention can be made from compositions selected to have relatively high temperature resistance, be resistant to chemical attack and be resistant to weathering.

The metal microfilaments are preferrably made from metal glass alloy compositions. The metal microfilaments depending on the metal glass allow compositions used, the diameter of the microfilaments formed and the cooling rate can be amorphous, partially polycrystalline or crystalline.

The metal microfilaments can be made in various lengths and diameters, depending upon the desired end use of the microfilaments. The microfilaments can have a length one half to twelve inches, preferably one to eight inches and more preferably two to six inches. The microfilaments can have a diameter of 0.5 to 40 microns, preferably 1.0 to 30 microns and more preferably 2 to 10 microns.

It is found that for a given set of operating conditions that the metal microfilaments that are obtained have a relatively uniform, narrow diameter size and length size distribution.

EXAMPLES

Example 1

A film forming metal material composition is used to make metal microfilaments.

The metal material composition is heated to a sufficiently high temperature to form a fluid molten metal. The molten metal just prior to the blowing operating, i.e. just before the beginning of the blowing of the microfilaments can have a viscosity of 35 to 60 poises.

The molten metal is fed to the apparatus of FIGS. 1 and 2 of the drawings. The molten metal passes through annular space 8 of about 0.005 inch, of blowing nozzle 5 and forms a thin liquid molten metal film across the orifices 6a and 7a. An inert blowing gas consisting of nitrogen at about the temperature of the molten metal and at a positive pressure is applied to the inner surface of the molten metal film causing the film to distend downwardly into a elongated cylinder shape with its inner end attached to the outer edge of orifice 7a.

The transverse jet is used to direct an inert entraining fluid which consists of nitrogen at about the temperature of the molten metal and at a linear velocity of 20 to 80 feet per second over and around the blowing nozzle 5 which entraining fluid assists in the formation of the elongated cylinder and of a multiplicity of microfilaments and detaching of the microfilaments from the elongated cylinder and causing the microfilaments to be entrained in the entraining fluid and carried away from the blowing nozzle. The transverse jet is aligned at an angle of 35° to 50° relative to the blowing nozzle.

The free falling, i.e. entrained, microfilaments are rapidly cooled to about ambient temperature by a dispersion of quench fluid at a temperature of −60° to −100° C. which quickly cools, solidifies and hardens the metal microfilament.

Metal microfilaments having a diameter of 2 to 6 microns diameter and a one to five inch length are obtained.

Example 2

A film forming metal glass alloy composition is used to make metal glass microfilaments.

The metal glass composition is heated to a high temperature sufficiently above its liquidus temperature to form molten metal. The molten metal glass just prior to the blowing operation can have a viscosity of 50 to 100 poises.

The molten metal glass is fed to the apparatus of FIGS. 1 and 3 of the drawings. The molten metal glass is passed through annular space 8 of blowing nozzle 5 and into tapered portion 21 of outer nozzle 7. The molten metal glass under pressure is squeezed through a fine gap formed between the outer edge of orifice 6a and the inner surface 22 of the tapered portion 21 of outer nozzle 7 and forms a thin liquid molten metal film across the orifices 6a and 7a. An inert blowing gas at about the temperature of the molten metal and at a positive pressure is applied to the inner surface of the molten metal glass film causing the film to distend outwardly into an elongated cylinder shape with its inner end attached to the outer edge of orifice 7a.

The transverse jet is used to direct an entraining fluid which consists of nitrogen at about the same temperature as the molten metal at a linear velocity of 20 to 80 feet per second over and around the blowing nozzle 5 which entraining fluid assists in the formation of the elongated cylinder and of a multiplicity of metal microfilaments and detaching of the metal microfilaments from the elongated cylinder and causing metal microfilaments to be entrained in the entraining fluid and carried away from the blowing nozzle. The transverse jet is aligned relative to the blowing nozzle as in Example 1.

The entrained metal microfilaments are contacted with a dispersion of a quench fluid at a temperature of $-60°$ to $-100°$ C. and are rapidly cooled at a rate of $10^{4°}$ to $10^{6°}$ C. per second to a temperature below the glass temperature and are solidified and hardened.

Amorphous metal glass microfilaments having a 1 to 5 micron diameter and having a length of 2 to 10 inches are obtained.

UTILITY

The metal material microfilaments of the present invention have many uses including the use of the microfilaments as a filler or reinforcing material in rubber compositions, cement, plaster and asphalt.

The metal microfilaments and wires made therefrom have a variety of uses such as reinforcement use in tire cords or as reinforcement in molded thermoplastics or thermosetting plastics, as filter media, uses in the manufacture of magnetic shields and magnets and corrosion resistant chemical processing equipment and the like.

The process and apparatus of the invention may be used to form microfilaments from metals such as iron, steel, nickel, gold, copper, zinc, tin, brass, lead, aluminum and magnesium and from metal glasses.

These and other uses of the present invention will become apparent to those skilled in the art from the foregoing description and the following appended claims.

It will be understood that various changes and modifications may be made in the invention, and that the scope thereof is not to be limited except as set forth in the claims.

What is claimed:

1. A method for making metal microfilaments which comprises heating film forming metal material to form molten film forming metal material, forming a liquid film of molten metal material across an orifice, applying a blowing gas at a positive pressure on the inner surface of the liquid metal material film to blow the metal material film and form an elongated hollow metal material tube or cylinder, forming a thinned wall or weakened portion of the elongated hollow metal material tube or cylinder, subjecting the elongated hollow tube or cylinder during its formation to a pulsating or fluctuating pressure field having periodic oscillations, said pulsating or fluctuating pressure field acting on said elongated hollow tube or cylinder to assist in its formation and to assist in the formation of a multiplicity of metal material microfilaments and in detaching the metal microfilaments from said orifice.

2. The method of claim 1 wherein said liquid film of molten film forming metal material is formed across the orifice of a coaxial blowing nozzle, said blowing nozzle having an inner nozzle to convey said blowing gas to the inner surface of the liquid metal material film, and an outer nozzle to convey said molten metal material to said orifice and means disposed near said orifice form the thinned wall or weakened portion of said elongated hollow metal material tube or cylinder, and pulsating or fluctuating pressure inducing means is directed at an angle to said coaxial blowing nozzle to induce said pulsating or fluctuating pressure field at the opposite or lee side of said coaxial blowing nozzle in the wake or shadow of said coaxial blowing nozzle.

3. The method of claim 1 wherein an entraining fluid is directed at an angle to a coaxial blowing nozzle having an orifice, an inner nozzle and an outer nozzle, the liquid metal material film of film forming metal material is formed across the orifice, the blowing gas is conveyed to the inner surface of the liquid metal film through said inner nozzle, the film forming metal material is conveyed through said outer nozzle to said orifice, and means disposed near said orifice between the inner and outer nozzle form a thinned wall or weakened portion of said elongated hollow metal material tube or cylinder and the entraining fluid passes over and around said coaxial nozzle to fluid dynamically induce the pulsating or fluctuating pressure field at the opposite or lee side of the blowing nozzle in the wake or shadow of the coaxial blowing nozzle.

4. The method of claim 3 wherein the lower portion of the outer nozzle is tapered inwardly to form with the outer edge of the inner nozzle a fine gap and the film forming metal material is fed under pressure and extruded through said gap to form a thin film of film forming metal material across the orifice of the blowing nozzle.

5. The method of claim 4 wherein quench means provide contact of a quench fluid with said metal material microfilaments to rapidly cool said metal material microfilaments at a rate of $10^{4°}$ to $10^{6°}$ C. per second and to solidify said metal material microfilaments.

6. The method of claim 3 wherein the molten film forming metal material has a viscosity of 10 to 400 poises.

7. The method of claim 6 wherein the molten film forming metal material has a viscosity of 20 to 250 poises.

8. The method of claim 6 wherein the molten film forming metal material has a viscosity of 30 to 150 poises.

9. The method of claim 3 wherein said entraining fluid has a linear velocity in the region of the elongated hollow tube or cylinder formation of 5 to 120 ft/sec and entrains and transports the microfilaments away from the blowing nozzle.

10. The method of claim 9 wherein said entraining fluid has a linear velocity in the region of elongated hollow tube or cylinder formation of 10 to 80 ft/sec.

11. The method of claim 9 wherein said entraining fluid has a linear velocity in the region of elongated hollow tube or cylinder formation of 20 to 60 ft/sec.

12. A method for making metal glass alloy microfilaments which comprises heating metal glass alloy to form molten metal glass alloy, forming a liquid film of molten metal glass alloy across an orifice of a coaxial blowing nozzle, said blowing nozzle having an inner nozzle to convey a blowing gas to the inner surface of the liquid metal glass alloy film and an outer nozzle to convey said molten metal glass alloy to said orifice, applying said blowing gas through said inner nozzle at positive pressure on the inner surface of the liquid metal glass alloy film to blow the film downwardly and outwardly to form an elongated hollow metal glass alloy tube or cylinder, means disposed near said orifice between the inner and outer nozzle form a thinned wall or weakened portion of said elongated hollow metal glass alloy tube or cylinder, continuously feeding said molten metal glass alloy to said outer nozzle while said elongated hollow tube or cylinder is being formed, directing an entraining fluid at said coaxial blowing nozzle at an angle relative to a line drawn through the center axis of said coaxial blowing nozzle, said entraining fluid passing over and around said coaxial blowing nozzle to fluid dynamically induce a pulsating or fluctuating pressure field having periodic oscillations at the opposite or lee side of the blowing nozzle in the wake or shadow of said blowing nozzle, said entraining fluid acting on the elongated hollow metal glass alloy tube or cylinder to break up said tube or cylinder into a multiplicity of metal glass alloy microfilaments which are connected to said metal glass alloy tube or cylinder at a point proximate to the coaxial blowing nozzle and said entraining fluid acting to detach the metal glass alloy microfilaments from the coaxial blowing nozzle and cooling and solidifying said metal glass alloy microfilaments.

13. The method of claim 12 wherein the lower portion of the outer nozzle is tapered inwardly to form with the outer edge of the orifice of the inner nozzle a fine gap and feeding the molten metal glass alloy under pressure through said gap to form a thin film of molten metal glass alloy across the orifice of the blowing nozzle.

14. The method of claim 12 wherein the metal glass alloy is heated to a temperature above its liquidus temperature to form the molten metal glass alloy and the microfilaments after being formed are rapidly cooled to a temperature below the glass temperature of the metal glass alloy.

15. The method of claim 14 wherein the metal glass alloy microfilaments are contacted with a quench fluid and are cooled at a rate of $10^{4\circ}$ to $10^{6\circ}$ C. per second.

16. The method of claim 12 wherein the metal glass alloy microfilaments are one to 8 inches in length and have a diameter of 1.0 to 30 microns.

17. The method of claim 16 wherein the metal glass alloy microfilaments are 2 to 6 inches in length and are 2.0 to 10 microns in diameter.

18. The method of claim 15 wherein the metal glass alloy microfilaments are formed from amorphous metal.

* * * * *